(12) United States Patent
Lück et al.

(10) Patent No.: US 7,022,148 B2
(45) Date of Patent: Apr. 4, 2006

(54) APPARATUS AND METHOD FOR SUPPLYING FUEL TO A GAS-GENERATING SYSTEM

(75) Inventors: Wolfgang Lück, Erbach (DE); Martin Schäfer, Kirchheim/Teck (DE); Erik Theis, Kirchheim/Tech-Nabern (DE)

(73) Assignee: NuCellSys GmbH, Kirchheim/Tech-Nabern (DE)

( * ) Notice: Subject to any disclaimer, the term of this patent is extended or adjusted under 35 U.S.C. 154(b) by 569 days.

(21) Appl. No.: 09/983,759

(22) Filed: Oct. 25, 2001

(65) Prior Publication Data

US 2002/0058170 A1 May 16, 2002

(30) Foreign Application Priority Data

Oct. 25, 2000 (DE) ................. 100 52 776

(51) Int. Cl.
*B01J 7/00* (2006.01)

(52) U.S. Cl. .......................... 48/61; 422/188

(58) Field of Classification Search ............ 48/61, 48/62 R, 75, 63, 86 R, 87, 89, 102 R, 106, 48/93, 94, 95, 119, 120, 127.9, 170, 190, 48/198.1, 211, 212, 213, 214 R, 215; 422/188, 422/196

See application file for complete search history.

(56) References Cited

U.S. PATENT DOCUMENTS

| 4,988,580 A | * | 1/1991 | Ohsaki et al. ................. 429/19 |
| 5,401,589 A | * | 3/1995 | Palmer et al. ................. 429/13 |
| 5,766,786 A | * | 6/1998 | Fleck et al. ................... 429/17 |
| 5,932,181 A | * | 8/1999 | Kim et al. .................. 422/188 |
| 6,241,792 B1 | * | 6/2001 | Schuessler et al. .... 48/197 FM |

FOREIGN PATENT DOCUMENTS

| DE | 4425634 | | 6/1998 |
| DE | 10003274 | | 8/2001 |
| EP | 0559816 | | 3/1995 |
| EP | 0887306 | | 6/2001 |
| JP | 1-315957 A | * | 12/1989 |
| JP | 1315957 | | 12/1989 |
| JP | 2-49359 A | * | 2/1990 |
| JP | 2049359 | | 2/1990 |
| JP | 6310162 | | 11/1994 |
| JP | 8111227 | | 4/1996 |
| JP | 57205972 | | 12/1998 |

OTHER PUBLICATIONS

Copy of German Search Report.
Copy of European Search Report.

* cited by examiner

*Primary Examiner*—Kevin P. Kerns
(74) *Attorney, Agent, or Firm*—Crowell & Moring LLP

(57) ABSTRACT

An apparatus for supplying fuel to a gas-generating system to generate hydrogen-rich gas in a fuel cell system includes two gas-generating components; a metering device, which can supply fuel by a valve-controlled distribution to each of the two gas-generating components; and a fuel storage basin. The fuel basin which supplies fuel to one of the gas-generating components during a changeover or connecting process between the gas-generating components.

2 Claims, 1 Drawing Sheet

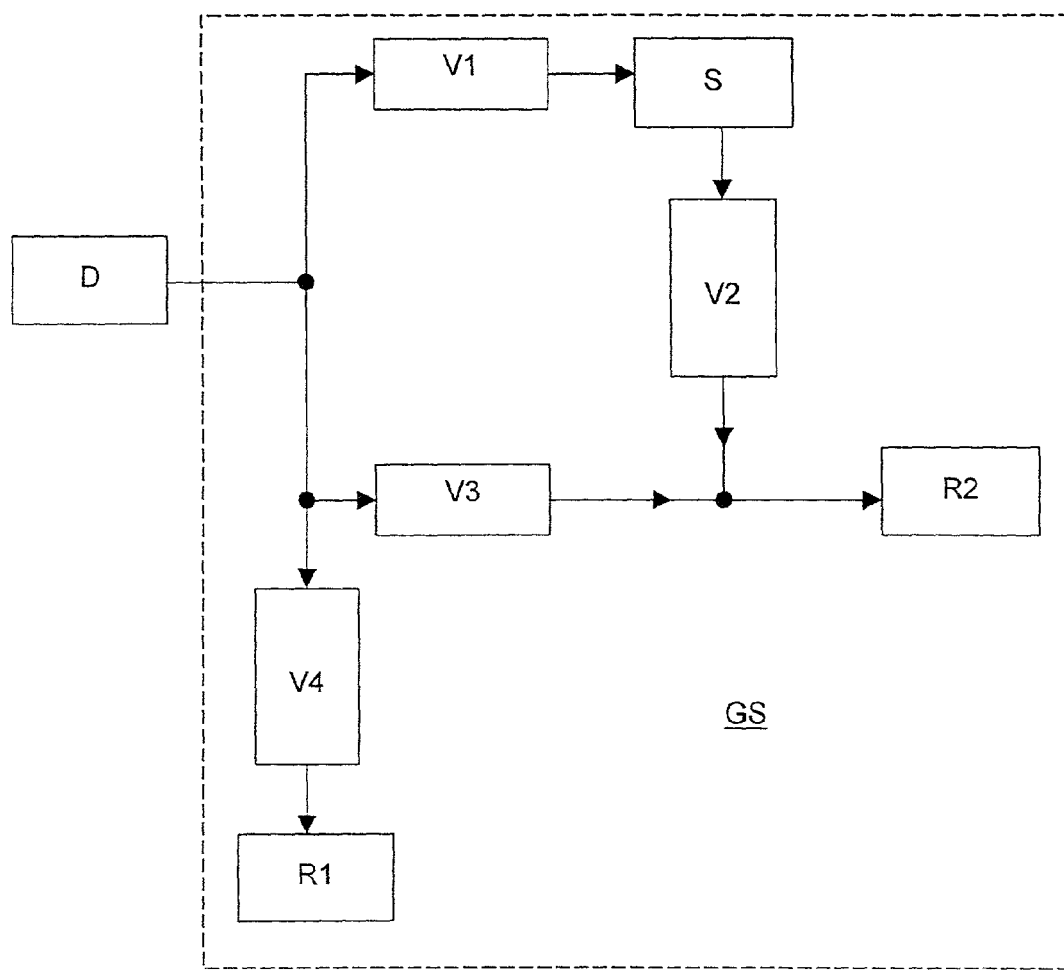

APPARATUS AND METHOD FOR SUPPLYING FUEL TO A GAS-GENERATING SYSTEM

This application claims the priority of German Patent Document No. 100 52 776.0, filed on Oct. 25, 2000, the disclosure of which is expressly incorporated by reference herein.

BACKGROUND AND SUMMARY OF INVENTION

The present invention relates to an apparatus for supplying fuel to a gas-generating system to generate a hydrogen-rich gas in a fuel cell system, the gas-generating system comprising two gas-generating components. Further, the present invention relates to a method for operating such an apparatus.

To operate fuel cells for mobile applications, hydrogen from a fuel, such as methanol, is generated in a gas-generating system by steam reforming and/or partial oxidation. For both processes, it is necessary to supply and meter the liquid reactants to the gas-generating components.

When operating a gas-generating system, it may be necessary to supply different gas-generating components consecutively with fuel. Usually, each gas-generating component has its own metering device for supplying and metering the fuel, which is separate from that of the other gas-generating components. It has proven to be a disadvantage that, when changing over or connecting the individual gas-generating components, a continuous metering and supplying of fuel to the individual gas-generating components is not assured.

Changing over or connecting the fuel supply from one gas-generating component to a different gas-generating component usually takes place by connecting a metering device of one gas-generating component to another gas-generating component that is to be switched over. The first gas-generating component can subsequently be switched off. This change between different operating states of the gas-generating system causes interference with the continuous metering and supplying of fuel to the gas-generating components. In addition, due to dead volumes, for example, there is interference with the continuous generation of hydrogen-rich gas in the gas-generating components for the downstream fuel cells. Accordingly, there is a drop in performance of the fuel cells.

It is an object of the present invention to provide an apparatus having a compact and inexpensive construction which allows change over between different operating states of the gas-generating system without a drop in performance of the downstream fuel cell. Further, it is an object of the present invention to provide a method for operating this apparatus.

For both gas-generating components, the apparatus according to the present invention has a common metering device, which supplies both gas-generating components with fuel over a valve-controlled distribution. In addition, a fuel storage basin is present. This fuel storage basin supplies fuel to a gas-generating component during the changeover or connecting process between gas-generating components.

Accordingly, it is possible, when changing over or connecting the individual gas-generating components, to ensure a continuous generation of hydrogen-rich gas for the downstream fuel cell. A drop in performance of the downstream fuel cell is prevented. The downstream fuel cell may be a PEM fuel cell with a proton-conducting electrolyte membrane.

It is a further advantage of the present invention that the inventive apparatus can be constructed compactly and inexpensively, since only a metering device is required for supplying fuel to the gas-generating components.

The fuel storage basin proves to be particularly advantageous with respect to good fuel metering to the gas-generating components.

In an embodiment of the present invention, the valve-controlled distribution is constructed in the following manner. A valve is connected between the metering device and the fuel storage basin; between the metering device and the first gas-generating component; between the metering device and the second gas-generating component; and between the fuel storage basin and the second gas-generating component.

Advantageously, the fuel storage basin can be filled with fuel before the gas-generating system is started and/or after it is switched off.

In an embodiment of the method according to the present invention, the first gas-generating component is changed over to or connected with the second gas-generating component by the following steps, starting by supplying fuel to the first gas-generating component by the metering device:

connecting the fuel storage basin to the second gas-generating component, so that both gas-generating components are supplied with fuel;

connecting the metering device to the second gas-generating component, so that both gas-generating components can be supplied simultaneously with fuel by the metering device, it being possible to supply the second gas-generating component additionally with fuel by the fuel storage basin;

disconnecting the fuel storage basin from the second gas-generating component, so that the two gas-generating components are supplied with fuel only by the metering device;

disconnecting the metering device from the first gas-generating component, so that only the second gas-generating component is supplied with fuel by the metering device.

It is also possible to reverse the sequence of the two steps of the process mentioned last.

Other objects, advantages and novel features of the present invention will become apparent from the following detailed description of the present invention when considered in conjunction with the accompanying drawing.

BRIEF DESCRIPTION OF THE DRAWING

The sole FIGURE shows a diagram of an embodiment of an apparatus according to the present invention.

DETAILED DESCRIPTION OF THE DRAWING

A metering system D supplies gas-generating system GS with fuel, such as gasoline or a mixture of methanol and water. The gas-generating system GS comprises two gas-generating components R1 and R2; a fuel storage basin S; and valves V1, V2, V3 and V4. The gas-generating components R1, R2 comprise reactors that produce a hydrogen-rich gas for a fuel cell system (not shown), for example, by partial oxidation and/or steam regeneration. It is possible that the two gas-generating components comprise reactors of different types. Moreover, at least one of the gas-generating components R1, R2 may be an evaporator for vaporizing liquid fuel.

Valve V4 is connected between metering system D and the first gas-generating component R1. Valve V1 is connected between the metering system D and fuel storage basin S. Valve V3 is connected between metering system D and the second gas-generating component R2. Valve V2 is connected between fuel storage basin S and the second gas-generating component R2.

Valves V1, V2, V3 and V4 control the flow of fuel. Fuel storage basin S supplies fuel to the second gas-generating component R2 during the changeover from the first gas-generating component R1 to the second gas-generating component R2.

During operation of the gas-generating system GS, initially the first gas-generating component R1 is supplied with fuel and therefore generates hydrogen-rich gas for fuel cells. For this purpose, the fuel is supplied by metering device D to the gas-generating component R1. During this phase of the operation, only the valve V4 between metering device D and the first gas-generating component R1 is open.

When changing over the fuel supply from the first gas-generating component R1 to the second gas-generating component R2, initially valve V2 between the fuel storage basin S and the second gas-generating component R2 is open. Fuel can therefore be supplied from the fuel storage basin S to the second gas-generating component R2. During this process, the first gas-generating component R1 continues to be supplied with fuel by metering device D.

Subsequently, valve V3 between metering device D and the second gas-generating component R2 is opened, as a result of which the second gas-generating component R2 is supplied simultaneously with fuel by metering device D and fuel storage basin S. The first gas-generating component R1 continues to be supplied with fuel by metering device D, so that both gas-generating components R1 and R2 are operated in parallel.

As soon as the gas-generating component R2 has reached its operating temperature and generates sufficient hydrogen-rich gas for operating the fuel cell, valves V4, V2, between metering device D and the first gas-generating component R1 and between fuel storage basin S and the second gas-generating component R2, are closed. Accordingly, only the gas-generating component R2 is supplied with fuel by metering device D.

The operation of gas-generating components R1 and R2, as well as the changing over process from the first gas-generating component R1 to the second gas-generating component R2, can be achieved with only one metering device D that is common to both gas-generating systems R1 and R2. Further, it is possible to change over without interfering with the continuous supply of hydrogen-rich gas to the fuel cells.

If a fuel storage basin S is not used, the difficulty arises that, when changing over to the second gas-generating component R2, the hydrogen-rich gas, which is generated there, is not available immediately to the fuel cell and, instead, must first fill a dead volume in the second gas-generating component R2 or in the associated pipelines with hydrogen-rich gas. Only subsequently is the hydrogen-rich gas, which is generated in the second gas-generating component R2, available for the fuel cell. The capacity of the fuel storage basin S preferably is chosen so that the stored amount of fuel is at least sufficient to fill the dead volume in the second gas-generating component R2 or in the associated pipelines with hydrogen-rich gas generated therein. During this time, the total amount of fuel is still available for the metering device D of the first gas-generating component R1.

An example of an apparatus according to the present invention is one with gas-generating systems GS with an evaporator and at least one reforming unit. During a start-up phase, liquid fuel is added directly to the reforming unit, while later on, during normal operation, an upstream evaporator is provided for evaporating the liquid fuel. In this case, the reforming unit corresponds to the first gas-generating component R1, which is supplied over valve V4 directly with liquid fuel during the starting process. The evaporator corresponds to the second gas-generating component R2, which is supplied later on with liquid fuel, while the supply to the first gas-generating component R1, that is, directly to the reforming unit, is interrupted. During the changeover, the evaporator is supplied from the fuel storage basin S until the dead volume in the evaporator is filled with gaseous fuel. At the same time, a supply pipeline from the evaporator, that is R2, to the reforming unit, that is R1, must be provided, in order to transport the gaseous fuel from the evaporator to the reforming unit during normal operation.

Another example of an apparatus according to the present invention corresponds to a gas-generating system GS with two reforming units connected in series. During the start-up process, only one of the reforming units R1 is supplied with fuel. During normal operation, the other unit or both reforming units R2, R1 are supplied with fuel. The fuel storage basin S is once again provided in order to supply the second reforming unit R2 with fuel during a changeover process until the associated dead volume is filled with hydrogen-rich gas. In this example, it is also possible to connect an evaporator upstream from one or both reforming units.

A further example of an apparatus according to the present invention relates to a gas-generating system GS with at least two reforming units. The two reforming units are provided, for example, for supplying hydrogen-rich gas during different load conditions. For example, one of the two reforming units may be provided to cover the peak load and therefore be connected only when a specified load boundary is exceeded. In this case, the two reforming units would be connected in parallel, the constantly operated reforming unit corresponding to the gas-generating component R1 and the reforming unit, which can be connected, corresponding to the gas-generating component R2. However, it is also possible to connect the two reforming units in series. In this case, the reforming unit, which can be connected, is activated above the load boundary by connecting the fuel metering system. Below the load boundary, the gases flow only passively through the reforming unit, which can be connected.

As can be inferred from the examples described above, the inventive apparatus and the inventive method can be employed for a plurality of gas-generating systems, the particular interconnected system and the number of components being immaterial. Only the fact that individual gas-generating components are added or that there is a changeover between at least two gas-generating components matters, the fuel storage basin being used to bridge dead times.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. An apparatus for generating hydrogen-rich gas for a fuel cell system, comprising:
   at least first and second gas-generating components;
   a common metering apparatus that can supply fuel to each of the first and second gas-generating components;
   a fuel storage basin; and
   a valve system operable to permit supply of fuel from the fuel storage basin to the second gas generating component while the first gas-generating component continues to be supplied with fuel by the common metering apparatus and while the first and second gas-generating devices are operated in parallel, and to terminate supply of fuel from the storage basin and to the first gas-generating component when the second gas-generating component reaches its operating temperature.

2. An apparatus according to claim 1, wherein the valve system comprises:
   a first valve connected between the metering apparatus and the first gas-generating component;
   a second valve connected between the fuel storage basin and the metering apparatus;
   a third valve connected between the fuel storage basin and the second gas-generating component; and
   a fourth valve connected between the metering apparatus and the second gas-generating component.

* * * * *